(12) United States Patent
Shen

(10) Patent No.: US 7,567,515 B2
(45) Date of Patent: Jul. 28, 2009

(54) INTER-LAYER COMMUNICATION OF RECEIPT CONFIRMATION FOR RELEASING RETRANSMISSION BUFFER CONTENTS

(75) Inventor: Qiang Shen, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 474 days.

(21) Appl. No.: 11/266,913

(22) Filed: Nov. 4, 2005

(65) Prior Publication Data

US 2007/0115823 A1 May 24, 2007

(51) Int. Cl.
*H04L 1/00* (2006.01)
(52) U.S. Cl. .................... 370/236; 370/230
(58) Field of Classification Search ........... 370/229, 370/230, 231, 235, 342, 479, 226, 315, 492, 370/236
See application file for complete search history.

(56) References Cited

U.S. PATENT DOCUMENTS

2002/0049068 A1* 4/2002 Koo et al. ............... 455/522
2003/0112759 A1* 6/2003 Zhang et al. ............ 370/236
2003/0202501 A1 10/2003 Jang
2004/0190552 A1 9/2004 Kim et al.
2005/0013303 A1 1/2005 Gopalakrishnan et al.
2005/0041581 A1* 2/2005 Kuusinen et al. ........ 370/230
2005/0135423 A1 6/2005 Chen et al.
2005/0163161 A1 7/2005 Wei et al.
2005/0185579 A1* 8/2005 Jung ....................... 370/229
2006/0140197 A1* 6/2006 Robinson et al. ........ 370/401

OTHER PUBLICATIONS

"cdma2000 High Rate Packet Data Air Interface Specification." 3$^{rd}$ Generation Partnership Project 2 "3GPP2". 3GPP2 C.S0024-B Version 1.0 May 2006 pp. 3-6 thru 3-9.

* cited by examiner

*Primary Examiner*—Ricky Ngo
*Assistant Examiner*—Wei-Po Kao
(74) *Attorney, Agent, or Firm*—James W. Huffman (57) ABSTRACT

Provided is a multi-layered transmission technique in which a signal indicating that a transmitted data packet has been correctly received by the receiver is provided from one communication layer to another. Based on that signal, the second layer releases the corresponding data from its retransmission buffer. As result, storage requirements for data waiting to be retransmitted, if necessary, often can be significantly reduced.

16 Claims, 4 Drawing Sheets

FIG. 1

(Prior Art)

INTER-LAYER COMMUNICATION OF RECEIPT CONFIRMATION FOR RELEASING RETRANSMISSION BUFFER CONTENTS

FIELD OF THE INVENTION

The present invention pertains to multi-layered communications systems and is particularly applicable to wireless transmitters using a multi-layered communications structure.

BACKGROUND

A packet-data communication system often has a layered structure. For example, the ISO OSI model has the following seven-layer structure: Physical (Layer 1), Data Link (Layer 2), Network (Layer 3), Transport (Layer 4), Session (Layer 5), Presentation (Layer 6) and Application (Layer 7).

Usually, different layers in the structure use different error-checking techniques, although some layers do not independently check for errors at all. One popular error-control technique, is automatic re-transmission request (ARQ), in which a packet of data is retransmitted if the packet is in error.

For certain upper layers where the error rate is low, only a negative acknowledgement signal (NAK) is transmitted from the receiver back to the transmitter when the receiver determines that a particular packet has been received in error. This often is efficient, as errors tend to occur significantly less frequently than correct receptions at the higher levels. Such an ARQ technique is called NAK-based.

On the other hand, for a lower layer that has an unreliable communication medium (e.g., wireless) there often is a higher chance that a lower-layer packet will be received in error. To reduce retransmission delays, in many implementations the receiver's lowest layer (e.g., the physical layer) acknowledges the reception of each packet, whether it is success (ACK) or failure (NAK), by transmitting the appropriate signal at a specifically allocated time slot that is usually a fixed period of time after the transmission of the packet.

Figure 1:
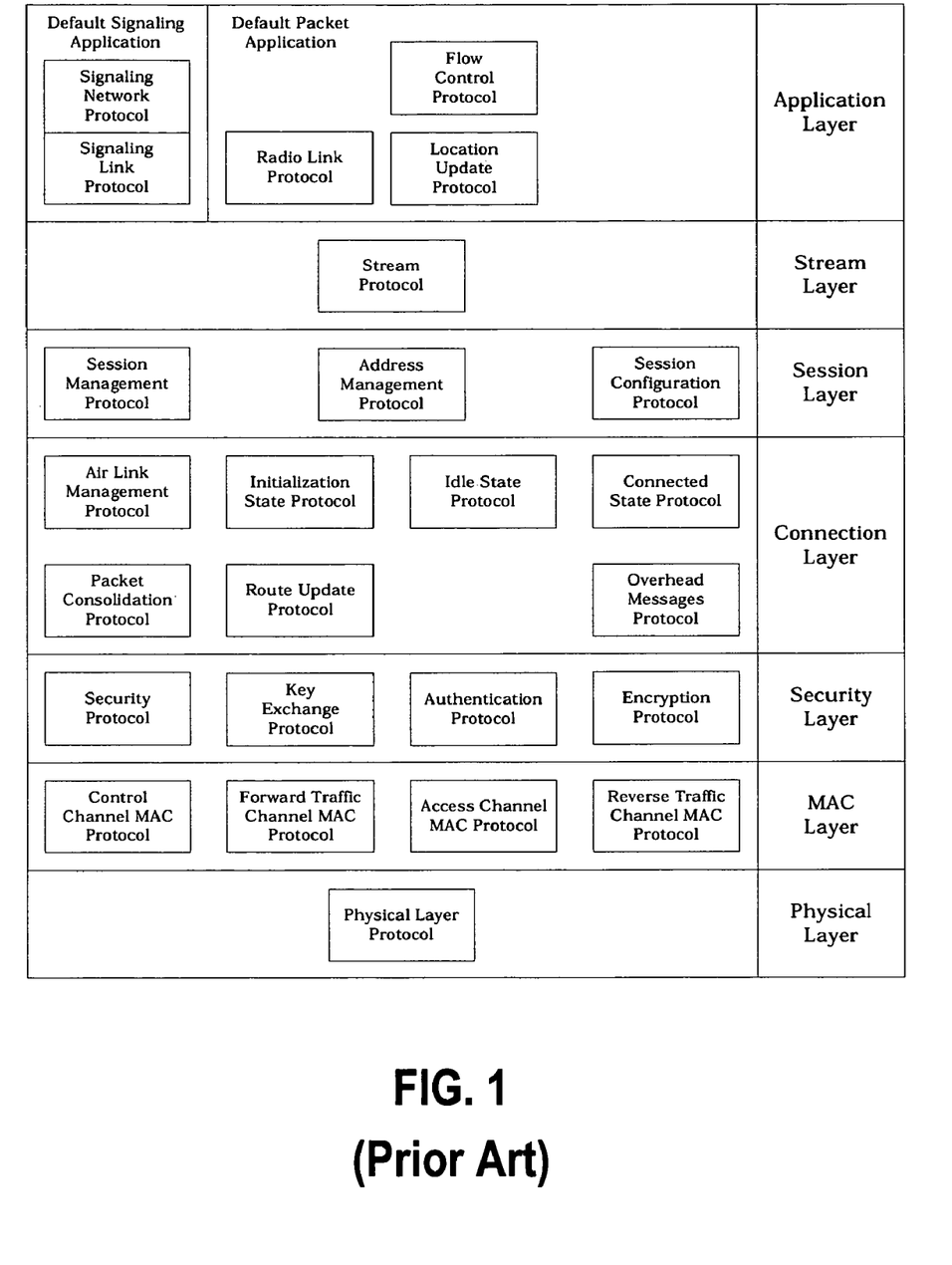
FIG. 1 is a diagram showing the communication layers for IS2000 EVDO, as defined in 3GPP2 C.S0024-A, Ver 1.0, cdma2000 *High Rate Packet Data Air Interface Specification*, March, 2004.

One example of a communications system that employs a layered structure is the code division multiple access (CDMA) IS2000 EVDO high-rate packet data wireless system. The communications layers in this system, together with the protocols executed in each, are defined in 3GPP2 C.S0024-A, Ver 1.0, cdma2000 *High Rate Packet Data Air Interface Specification*, March, 2004, as shown in FIG. 1.

In IS2000 EVDO, the physical layer transmission is over a mobile wireless environment and can have an error rate of about 10%. The ACK/NAK signal is pre-scheduled during a fixed time interval after the receiver receives the packet, so the transmitter knows a short period of time after the packet has been transmitted whether the packet has been transmitted successfully. If a NAK is received, the transmitter will retransmit the erroneous packet (with possible modification of the encoding pattern) until it has been retransmitted a certain number of times. As a result of this ARQ protocol, the overall error rate typically can be reduced to around 1%.

On the application layer of IS2000 EVDO, there is a Radio Link Protocol (RLP) that performs further ARQ. It is purely NAK-based, i.e., the transmitter will know that a packet is in error only if it receives a NAK signal. Once it receives a NAK for a certain packet, the transmitter RLP typically will send the NAK'ed erroneous data if it hasn't done so previously, and it can discard all packets transmitted prior to the packet to which the received NAK signal pertains, as those packets either have been successfully received or have been retransmitted once already. The RLP at the receiver side guarantees that only one NAK signal will be sent for each error packet and such NAK signals will be sent with respect to the packets in the order of their sequence numbers.

Several of the transmitter layers maintain a retransmission buffer for storing and then, if it is determined that the subject data were not accurately received, retransmitting data. As noted above, different layers often use different types of error-checking techniques for this purpose. In general, on each layer the receiver has various ways to detect error transmission and create the ACK or NAK signal or message. One way is by performing CRC (cyclic redundancy check) that is built into the current layer data packet. Another way is by comparing the received data sequence, e.g., when the data sequence is received discontinuously, then the missing sequence indicates missing (erroneous) data packet. The second method is used by RLP in IS2000 EVDO.

SUMMARY OF THE INVENTION

The present inventor has discovered that in some situations a transmitter is required to maintain data in a retransmission buffer longer than is necessary. For example, in certain situations the RLP will not receive a NAK signal from the receiver for a prolonged period of time. This could happen when the channel is good so that the received packet is correct for a long period of time. In such a case, as noted above, the receiver will not send anything to the transmitter upper layer because it is purely NAK-based. Alternatively, it could be that a NAK signal is lost in transmission from the receiver to the transmitter. In both of these scenarios, the transmitter does not know whether the corresponding transmitted upper layer packets are needed or not for retransmission, so it has to keep all of them. For a high-speed packet communication system, this could require the use of a sizable amount of memory at the transmitter side.

Similarly, a layer can be constructed that relies on a retransmission buffer but does not have its own error-checking capabilities at the receiver. In such a case, an error signal from another layer (e.g., a lower layer) can be used to trigger a retransmission out of the retransmission buffer for the upper layer. Typically, prior to the present invention, the upper layer in such an implementation would have been required to maintain transmitted data in the retransmission buffer for the maximum period of time during which retransmission could be helpful, thus again requiring use of a significant amount of memory for the retransmission buffer.

The present invention addresses this problem by providing a multi-layered transmission technique in which a signal indicating that a transmitted data packet has been correctly received by the receiver is provided from one communication layer to another. Based on that signal, the second layer releases the corresponding data from its retransmission buffer. As result, storage requirements for data waiting to be retransmitted, if necessary, often can be significantly reduced.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 2:
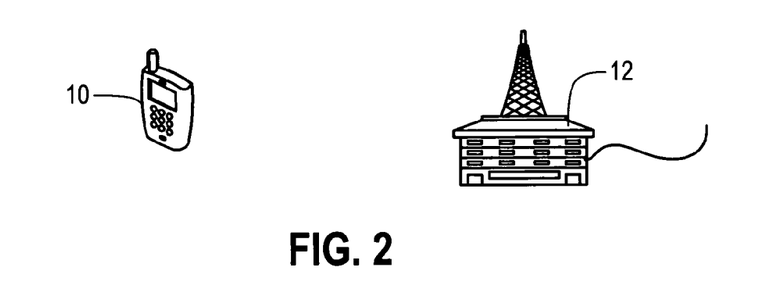
FIG. 2 illustrates a representative communications environment utilizing the techniques of the present invention.

FIG. 2 illustrates a representative communications environment utilizing the techniques of the present invention. Typically, a cellular-based wireless communication system includes a large number of mobile wireless devices 10 communicating with a somewhat smaller number of fixed base stations 12. Ordinarily, the base stations 12 are interconnected with each other as part of a large network and are geographically laid out, e.g., in a grid, so as to provide maximum wireless coverage, subject to technological and economic considerations. As an individual mobile unit 10 moves about, it seamlessly drops communications with one base station and begins communicating with another, in order to maintain a strong wireless connection link with the overall network, and/or to satisfy other considerations (e.g., to satisfy base station capacity considerations). Although the following discussion primarily concerns an example of a cellular-based wireless communication system, it should be understood that the systems and techniques of the present invention are applicable to any multi-layered communication conducted between two devices.

Figure 3:
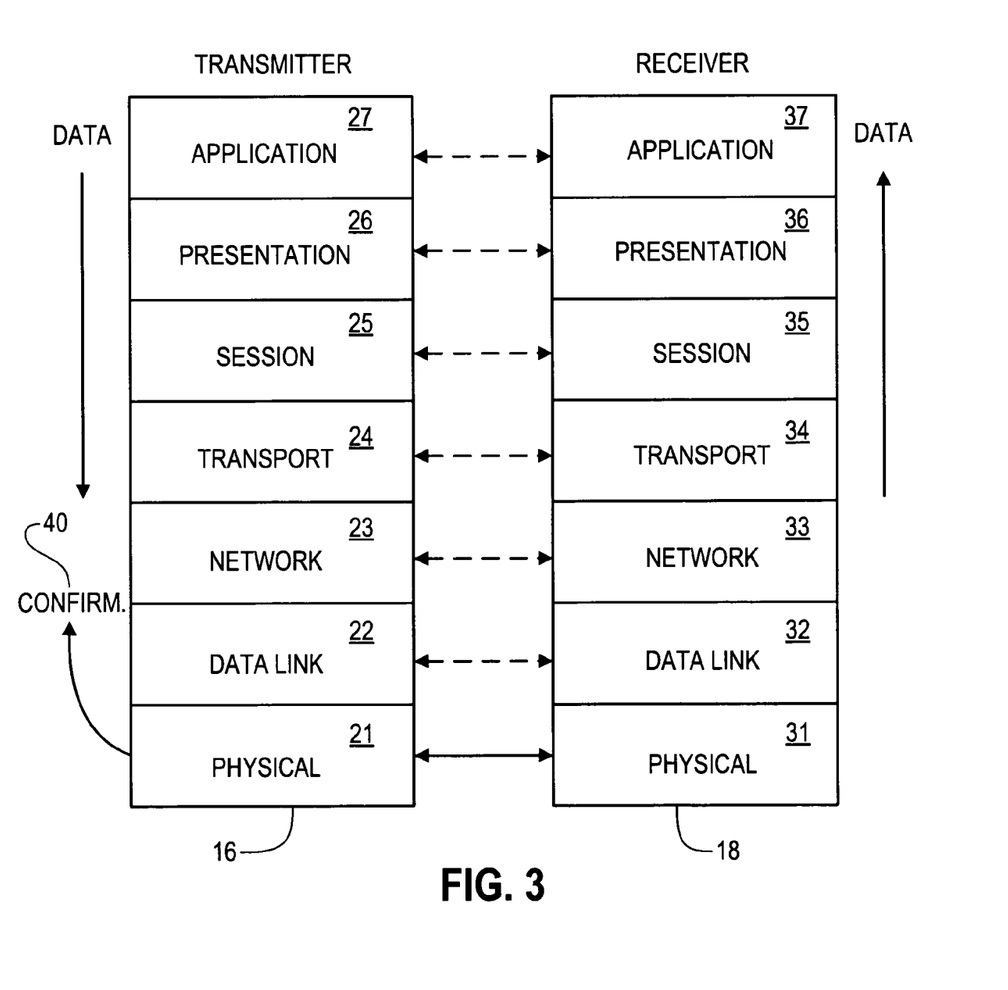
FIG. 3 illustrates a multi-layered communication structure for communicating from a transmitter to a receiver according to a representative embodiment of the present invention.

FIG. 3 illustrates a multi-layered communication structure for communicating from a transmitter 16 to a receiver 18 according to a representative embodiment of the present invention. It should be noted that often when two devices are communicating, each alternately will assume the role of transmitter and receiver, so the assignment of these labels to individual devices almost always will be time-dependent. As can be seen in FIG. 3, a plurality of layers are shown stacked vertically. The lower layers are the layers closest to the actual transmission of data, with the very lowest layer typically being the physical layer 21 or 31 at which data are actually transferred, i.e., from the transmitter's physical layer 21 to the receiver's physical layer 31.

Upper layers typically employ higher levels of abstraction with respect to the actual data transmission details, with the very top layer 27 of the transmitter 16 being largely unconcerned with the details of how the data are packaged and transmitted to the receiver 18 and, correspondingly, with the very top layer 37 of the receiver 18 being largely unconcerned with how the data are unpackaged and received from the transmitter 16. The seven-layer ISO OSI model is illustrated in FIG. 3 and forms the basis for the discussion of the present embodiment; however, it should be noted that the present invention can be incorporated into any other multi-layered model having any number of layers.

As further indicated in FIG. 3, data typically originate at the top layer 27 (e.g., the application layer) of the transmitter 16 and are passed through successively lower layers at which additional information is added and additional processing performed: to ensure correct delivery, to compress the data, to permit communications in an environment where multiple devices may be simultaneously communicating with the receiver 18, etc. Finally, at the physical layer 21 the resulting data are transferred to the physical layer 31 of the receiver 18.

Upon receipt, physical layer 31 of receiver 18 typically performs the reverse processing that was performed at physical layer 21 of the transmitter 16, checks for errors, sends the appropriate acknowledgment (ACK) or negative acknowledgment (NAK) back to physical layer 21 at transmitter 16, etc., and then provides the correctly received packets up to the next higher layer 32. It is noted that the term "packet" as used herein is intended to mean any block or segment of data, however delineated; however, it usually refers to a block of data sent from the transmitter 16 to the receiver 18 as a unit.

Generally speaking, each layer 31-37 at the receiver 18 performs corresponding processing to that performed at the respective layer 21-27 of the transmitter 16. Conceptually, therefore, in most such multi-layered systems communication is thought of as occurring between corresponding layers of the transmitter 16 and the receiver 18, although as noted above typically the only physical transfer of data occurs at the lowest (e.g., physical) layers 21 and 31. It should be noted that although communications between the layers of transmitter 16 and receiver 18 are shown as being bidirectional, generally speaking most of the communications will be from the transmitter 16 to the receiver 18, typically with only feedback signals such as NAK and/or ACK being provided from the receiver 18 to the transmitter 16. Ordinarily, the transmitter 16 and receiver 18 will have corresponding layers, as shown in FIG. 3. However, in certain embodiments of the layers may differ and/or either the transmitter 16 or the receiver 18 may have one or more layers that is not present in the other.

Preferably, each layer is separately implemented and has its own defined specifications in terms of the type of processing to be performed and the data types to be handled and/or to be inserted into a packet. In addition, communications between the layers preferably are tightly defined, often with communications exclusively or almost exclusively occurring through defined interfaces, which interfaces are mandated pursuant to a common specification that pertains to the entire communications system (e.g., IS2000 EVDO). As a result of clearly delineating the different layers for the entire communications system, it often is possible to modify the specifications for a particular layer (or to change some aspect of the layer within the scope of the defined specifications) without changing the other layers. This division into layers often can be helpful with respect both to the original design and subsequent modification of the overall communication system, which often is particularly important in complicated systems where it is contemplated that hundreds, thousands, tens of thousands or even millions of devices may be communicating simultaneously.

Figure 4:
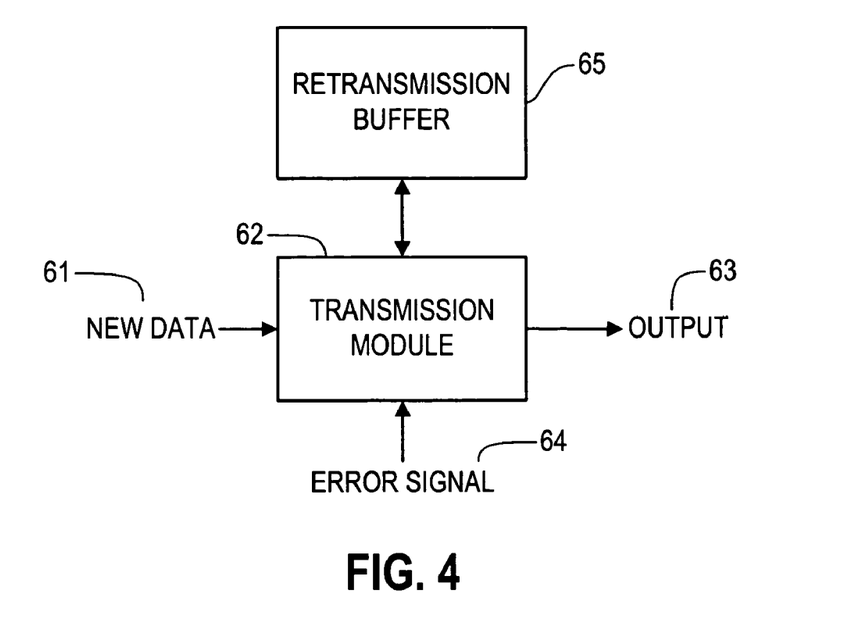
FIG. 4 is a block diagram illustrating transmission and retransmission of data according to representative embodiments of the present invention.

On the side of the transmitter 16, often one or more of the layers 21-27 will have the ability to retransmit data based on an indication that the data were not received (or, more typically, were received incorrectly) by receiver 18. A graphical depiction of this capability, which may be implemented in any of the layers 21-27, is shown in FIG. 4.

Ordinarily, new data 61 will be prepared in, and then output from, transmission module 62. Preferably, the output 63 is provided either to the next lower layer or (e.g., in the case of physical layer 21) to the receiver 18. However, the transmission module 62 also has access to a retransmission buffer 65 into which all new data 61 output by transmission module 62 preferably are stored, at least on a temporary basis. Accordingly, upon receipt of an error signal 64 the transmission module 62 will have the ability to retrieve the corresponding data (which were not correctly received by receiver 18) from the retransmission buffer 65 and output it once again.

A number of variations are possible. For instance, the error signal 64 may be generated within the current layer itself based on a predefined signaling message that is created on the same layer at the receiver end, is correctly received over the transmission media and is passed from the lower layer of the transmitter end, the error signal 64 may be generated within the current layer itself based on other information passed to it from a lower layer (if any), the error signal 64 may be received directly from a lower layer (with no additional processing in the current layer to determine that the data packet was in fact received in error), or the error signal 64 may be generated by any combination of processing at the current layer or any lower layer(s). Also, the current layer might automatically attempt to retransmit the subject data packet upon receipt of the error signal 64 or might include some logic to determine whether the subject data packet should be transmitted once an error signal 64 has been received). In this latter case, e.g., the current layer might decide that, even though the subject data packet apparently has been received in error, enough time has passed that retransmitting it would be futile, or the current layer might find that a predetermined maximum number of retransmissions of the subject data packet by the current layer already has been reached. Finally, if the decision is made to retransmit the subject data packet, then it might be retransmitted in exactly the same format as before or, alternatively, might be recoded in a different manner to facilitate correct receipt at the side of the receiver 18 (which, in turn, can be configured to attempt to identify the contents of the retransmitted data packet in isolation or by using both the earlier transmission and the current transmission).

In any event, if the decision to retransmit is made, the subject data packet is retrieved from retransmission buffer 65 and then output 63. One consideration in connection with the foregoing technique is management of the contents of retransmission buffer 65.

A conventional technique for controlling a retransmission buffer's contents, sometimes used in the upper layers of a communication system, is to specify a fixed time duration for which the transmitter upper layer needs to keep the transmitted packets. In this case, a transmitter upper layer can discard a transmitted packet either when it is sure the packet has been successfully received, when the packet has been re-transmitted up to a predetermined times, or, if none of the above can be decided, after a pre-specified period of time since that packet has been transmitted.

The selection of the hold time becomes a trade off of memory efficiency and ARQ performance. If the hold time is shorter than the round trip delay of the NAK, then it may turn out that the discarded packet is needed for re-transmission. On the other hand, longer hold time means larger memory for transmitted packets.

The present invention makes use of the regularly scheduled ACK/NAK signal that is available on the lower layer (e.g., physical layer 21) to provide reference to an upper layer. More specifically, when a lower-layer packet is transmitted, the receiver 18 preferably will send an acknowledgment (either an ACK or a NAK signal) after a fixed time duration, indicating whether the packet has been received successfully or not. When the lower layer receives a success (ACK), it can start transmitting the next lower layer packet. At the same time, the lower layer informs the upper layer regarding the octets of the upper layer that that have been successfully carried by the lower-layer packet. The upper layer then preferably releases the memory space that stores those successful upper-layer octets. If the receiver 18 receives a NAK signal, it retransmits the lower-layer packet or informs the upper layer of the octets associated with the failed transmission, in which case the upper layer octets preferably schedules the retransmission of those octets.

Assume K octets of upper layer data, I to I+K−1, are transmitted by a lower-layer packet, here I is the sequence number of the upper layer data stream. The lower-layer packet is transmitted at time T. After a fixed time period, the transmitter 16 receives either an ACK or NAK for that packet.

When a lower-layer ACK is received, the lower layer preferably sends this indicator to the upper layer and the upper layer preferably then releases the memory occupied by those K octets. At the same time, the lower layer preferably is scheduling the transmission of a new packet.

When a lower-layer NAK is received, the lower layer preferably retransmits the lower-layer packet, according to the specific lower-layer protocol. Usually, if the lower layer performs the retransmission, it does not inform the upper layer about the NAK transmission result, as the packet transmission is not considered complete. On the other hand, if the lower layer does not have the option to retransmit the packet (e.g, it has reached the maximum number of allocated slots for that packet), then the lower layer preferably signals the upper layer about the failure of the transmission, and then upper layer preferably schedules its retransmission.

The lower layer ACK/NAK usually is a single indicator that is modulated either by OOK (on-off key) or BPSK (binary phase shift key). Because the ACK/NAK transmission is also subject to channel impairments, the packet transmitter makes decisions based on the received modulated indicator. It is advantageous to make two decisions with two decision criteria for detecting the ACK/INAK indicator. One is to decide whether the lower layer transmission is successful; another is to decide whether the upper layer can release the data octets that are associated with the lower-layer packet. Both decision criteria are intended to ensure that the miss detection probability of NAK is below certain levels, but preferably that probability from the higher-layer criterion is even lower, such that there is smaller chance for the upper layer to mistakenly release the data that would be requested later had it been a decision error of the NAK indicator.

We denote the lower- and higher-layer indicators as L{+1, −1} and U{+1, −1}, resulting from applying two decision criteria to the lower-layer ACK/NAK indicator, +1 representing an ACK decision and −1 representing a NAK decision. The criterion for U to take +1 preferably is set higher than that of L (so that there is a lower probability that U mistakenly will be assigned a value of +1).

The lower layer preferably performs the following actions once ACK/NAK is received and L and U are decided: (i) if L=−1, schedule retransmission if allowed by the lower-layer protocol, and if retransmission is not allowed by the lower-layer protocol, set U=−1 and send the indicator to the upper layer; (ii) If L=+1, schedule a new packet transmission, and send U to the upper layer (in this case, U can be either be +1 or −1).

The upper layer actions preferably are: (i) if no U is received, do nothing; (ii) if U=+1 is received, release from the retransmission buffer 65 all octets associated with this U value; (iii) if U=−1 is received, do nothing if L=+1, or if L=−1, schedule the retransmission of the corresponding octets using the upper-layer ARQ protocol, subject to other conditions (e.g. if it was already retransmitted a certain maximum number of times).

Certain of the foregoing concepts are now discussed in more detail with reference to FIGS. 5-7, with particular emphasis on the provision of a signal indicating correct receipt of a packet from one transmitter layer (e.g., a lower layer such as physical layer 21) to another (e.g., an upper layer).

Figure 5:
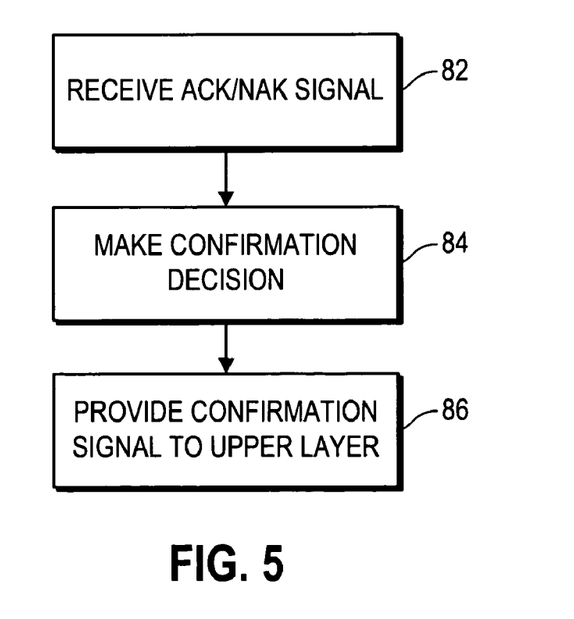
FIG. 5 is a flow diagram illustrating some of the processing performed on a lower communications layer of a transmitter according to a representative embodiment of the present invention.

FIG. 5 is a flow diagram illustrating some of the processing performed on a lower communications layer (e.g., physical layer 21) of the transmitter 16 according to a representative embodiment of the present invention. Initially, in step 82 an ACK/NAK signal is received from the receiver 18.

In step 84, a decision is made as to whether the signal received in step 82 indicates confirmation that the subject data packet was received correctly by the receiver 18. This decision is specific to whether or not to release the corresponding data from the retransmission buffer 65. Therefore, as discussed elsewhere in this specification, the decision criterion is set accordingly.

In step 86, assuming that step 84 determined that the data packet was correctly received by receiver 18, a confirmation signal for the (shown in FIG. 3) is provided to another of the communication layers, preferably an upper layer.

In the embodiment described above, it is assumed that the decision as to whether the data packet was correctly received is made in step 84 at the lower layer (i.e., the same layer that received the ACK/NAK signal from the receiver 18). However, in alternate embodiments the lower layer simply transmits the raw ACK/NAK signal (i.e., as the confirmation signal) to the upper layer for the upper layer to make the decision.

Figure 6:
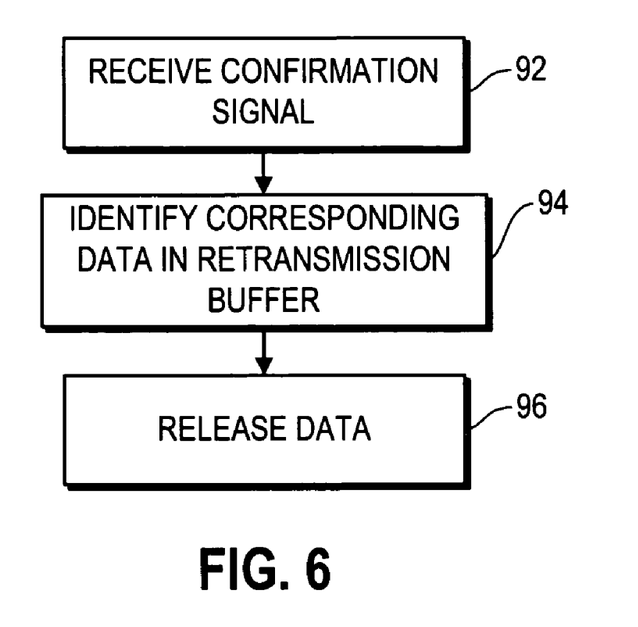
FIG. 6 is a flow diagram illustrating some of the processing performed on an upper communications layer of a transmitter according to a representative embodiment of the present invention.
Figure 7:
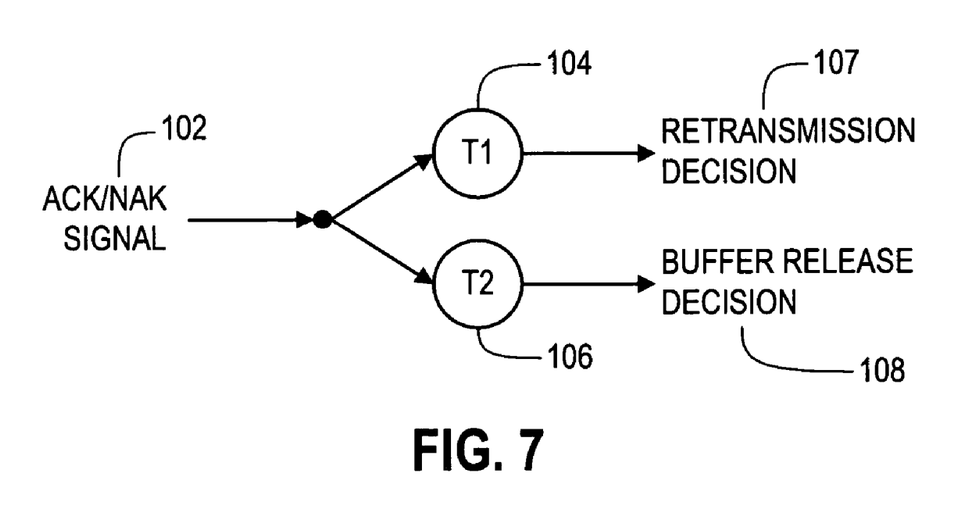
FIG. 7 is a block diagram illustrating the separate determination of a retransmission decision and a buffer release decision according to a representative embodiment of the present invention.

FIG. 6 is a flow diagram illustrating some of the processing performed on the upper communications layer of the transmitter 16 according to a representative embodiment of the present invention. Initially, in step 92 the upper layer receives the confirmation signal that was provided by the lower layer in step 86.

Next, in step 94 the upper layer identifies the corresponding data in the retransmission buffer 65.

Finally, in step 96 the upper layer decides whether to release such data based on the confirmation signal. This may be a straightforward determination if the decision already has been made by the lower layer, as described above. Alternatively, the decision may be made partly or wholly and the upper layer, e.g., based on the raw ACK/NAK signal provided by the lower layer.

As indicated above, two decisions preferably are made at the transmitter side. One is whether to release the data in the subject in the packet from the retransmission buffer 65. The other is whether to retransmit the subject data. FIG. 7 is a block diagram illustrating these decisions, according to a representative embodiment of the present invention.

As shown, both of such decisions preferably are based on the same ACK/NAK signal 102 that has been received from receiver 18. However, different thresholds 104 and 106 are used for the two decisions. If a first threshold 104 is satisfied, then a determination 107 is made that the data packet was correctly received by receiver 18 and some of the data packet need not be retransmitted. However, even if that first threshold 104 is satisfied, a positive confirmation with respect to the decision 108 to release the corresponding data from the retransmission buffer 65 will not be made unless a second threshold 106 is satisfied, with threshold 106 preferably being higher than threshold 104, as the erroneous release of data from retransmission buffer 65 is more problematic than simply omitting to retransmit the data packet at a particular point in time.

System Environment.

Generally speaking, nearly all of the methods and techniques described herein can be practiced with the use of a multi—purpose computing system. Such a computing system may comprise, e.g., a desktop, laptop or server computer, which typically will include, for example, at least some of the following components interconnected with each other, e.g., via a common bus: one or more central processing units (CPUs), read-only memory (ROM), random access memory (RAM), a wireless transceiver (preferably cellular-based), input/output software and/or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an optomagnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as wireless (or otherwise networked) PDAs, wireless telephones or any other appliance or device, preferably hardwired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and/or chemical processing.

Additional Considerations.

In the particular embodiment described above, because the error probability on the upper layer is relatively small, the present invention often can result in considerable memory space saving. For example, if the residual error rate after the lower-layer ARQ is 1%, upper layer memory saving of up to 99% typically can be achieved.

The use of two threshold detection criteria (one for retransmission and another for releasing data from the retransmission buffer) can be implemented so as to reduce the probability that the upper layer prematurely will discard data that could be needed later on, while simultaneously maintaining the required transmission throughput and delay on the lower layer. However, it is possible to use the single detection criterion.

In the embodiments described above, a lower layer provides to an upper layer an indication as to whether the receiver correctly received a given data packet for the purpose of allowing the upper layer to release corresponding data from its retransmission buffer. However, it is also possible in accordance with the present invention for an upper layer to provide such an indication to a lower layer, e.g., for a similar purpose.

As noted above, the invention preferably applies to the error-detection mechanism of the RLP or another protocol on one of the higher layers that does not utilize a separate CRC. That is because, for upper layers using a CRC, the CRC on the upper layer might indicate erroneous reception even though CRC on the lower layer indicates correct reception. Accordingly, in such cases the additional CRC check capability of the upper layer typically needs to be maintained, and so in such cases the upper layer preferably does not only rely on the lower layer CRC to release data from the retransmission buffer. However, the techniques of the present invention also can be advantageously applied to layers which have their own error-checking capabilities. Moreover, as noted above, upon receiving the confirmation signal 40, the receiving layer can automatically release the corresponding data from its retransmission buffer 65 or can base the release decision on other information in addition to such confirmation signal 40.

The systems and techniques of the present invention are described above primarily in the context of particular wireless communications systems. However, present invention is more generally applicable to any multi-layered communications system.

Also, several different embodiments of the present invention are described above, with each such embodiment described as including certain features.

However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for wireless communications, comprising:
   a transmitter configured to transmit data using a multilayered communication model that includes a plurality of layers;
   wherein each layer in the plurality of layers has its own specifications, said specifications including defined interfaces for communicating with an adjacent layer; and
   wherein the layers are configured such that:
   (a) a first layer executes a protocol that includes receiving an acknowledgment signal indicating that a specified data packet has been received correctly;
   (b) based on the acknowledgment signal, the first layer provides a confirmation signal to a second layer that is a different layer than the first layer; and
   (c) based upon receipt of the confirmation signal from the first layer, the second layer releases data corresponding to the specified data packet from a retransmission buffer based solely on receipt of the confirmation signal from the first layer; and
   wherein the first layer is configured to receive the acknowledgment signal or a negative acknowledgment signal with respect to each of a plurality of data packets transmitted by the first layer; and
   wherein the first layer providing the confirmation signal is based on receipt of the acknowledgement signal or the receipt of the negative acknowledgement signal and a first and second criteria, wherein the first criteria is usable to determine whether the first layer transmission is successful, and wherein the second criteria is usable to determine whether the second layer releases the data associated with the first layer.

2. The apparatus according to claim 1, wherein the first layer comprises a physical layer.

3. The apparatus according to claim 1, wherein the second layer is further from physical transmission than the first layer.

4. The apparatus according to claim 1, wherein the second layer does not perform its own error checking.

5. The apparatus according to claim 1, wherein the transmitter uses the multilayered communication model for communicating over a cellular-based wireless network.

6. The apparatus according to claim 5, wherein the cellular-based wireless network is a code division multiple access (CDMA) network.

7. The apparatus according to claim 1, wherein the first layer also is configured to provide an error signal to the second layer, and wherein upon receipt of the error signal the second layer is configured to cause data corresponding to the error signal to be retransmitted from the retransmission buffer.

8. The apparatus according to claim 1, wherein a first decision is made regarding correctness of the specified data packet for purposes of retransmitting the specified data packet and a second decision is made regarding correctness of the specified data packet for purposes of releasing the data corresponding to the specified data packet from the retransmission buffer, and wherein different criteria are used for making the first decision and the second decision.

9. A machine-readable memory medium storing program instructions for facilitating wireless communications, wherein the program instructions are executable to implement:
   a transmission module configured to transmit data using a multi-layered communication model that includes a plurality of layers,
   wherein each layer in the plurality of layers has its own specifications, said specifications including defined interfaces for communicating with an adjacent layer, and wherein the layers are configured such that:
   (a) a first layer executes a protocol that includes receiving an acknowledgment signal indicating that a specified data packet has been received correctly;
   (b) based on the acknowledgment signal, the first layer provides a confirmation signal to a second layer that is a different layer than the first layer; and
   (c) based on receipt of the confirmation signal from the first layer, the second layer releases data corresponding to the specified data packet from a retransmission buffer based solely on receipt of the confirmation signal from the first layer; and
   wherein the first layer is configured to receive the acknowledgment signal or a negative acknowledgment signal with respect to each of a plurality of data packets transmitted by the first layer; and
   wherein the first layer providing the confirmation signal is based on receipt of the acknowledgement signal or the receipt of the negative acknowledgement signal and a first and second criteria, wherein the first criteria is usable to determine whether the first layer transmission is successful, and wherein the second criteria is usable to determine whether the second layer releases the data associated with the first layer.

10. The machine-readable memory medium according to claim 9, wherein the first layer comprises a physical layer.

11. The machine-readable memory medium according to claim 9, wherein the second layer is further from physical transmission than the first layer.

12. The machine-readable memory medium according to claim 9, wherein the second layer does not perform its own error checking.

13. The machine-readable memory medium according to claim 9, wherein the transmission module uses the multi-layered communication model for communicating over a cellular-based wireless network.

14. The machine-readable memory medium according to claim 13, wherein the cellular based wireless network is a code division multiple access (CDMA) network.

15. The machine-readable memory medium according to claim 9, wherein the first layer also is configured to provide an error signal to the second layer, and wherein upon receipt of the error signal the second layer is configured to cause data corresponding to the error signal to be retransmitted from the retransmission buffer.

16. The machine-readable memory medium according to claim 9, wherein a first decision is made regarding correctness of the specified data packet for purposes of retransmitting the specified data packet and a second decision is made regarding correctness of the specified data packet for purposes of releasing the data corresponding to the specified data packet from the retransmission buffer, and wherein different criteria are used for making the first decision and the second decision.

* * * * *